(12) United States Patent
Selvini et al.

(10) Patent No.: US 7,171,112 B2
(45) Date of Patent: Jan. 30, 2007

(54) VISOR ADJUSTMENT DEVICE

(75) Inventors: Frederic Selvini, Falck (FR); Patrick Welter, Lachambre (FR)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 0 days.

(21) Appl. No.: 10/544,552

(22) PCT Filed: Feb. 10, 2004

(86) PCT No.: PCT/EP2004/001203

§ 371 (c)(1),
(2), (4) Date: Aug. 5, 2005

(87) PCT Pub. No.: WO2004/071796

PCT Pub. Date: Aug. 26, 2004

(65) Prior Publication Data

US 2006/0049655 A1    Mar. 9, 2006

(30) Foreign Application Priority Data

Feb. 17, 2003  (DE) ............... 103 06 733

(51) Int. Cl.
    *B60J 3/00* (2006.01)
(52) U.S. Cl. .................. 396/97.9; 296/97.11
(58) Field of Classification Search ............. 296/97.9,
    296/97.11, 97.12, 97.13; 248/291.1, 292.13
    See application file for complete search history.

(56) References Cited

U.S. PATENT DOCUMENTS

| | | | |
|---|---|---|---|
| 3,378,297 A | | 4/1968 | Temes et al. |
| 4,617,699 A | * | 10/1986 | Nakamura ............... 296/97.9 |
| 5,007,622 A | | 4/1991 | Gabas |
| 5,338,083 A | | 8/1994 | Gute |
| 5,564,772 A | * | 10/1996 | Miller .................. 296/97.12 |
| 5,924,748 A | * | 7/1999 | Zapinski ............... 296/97.12 |
| 5,967,587 A | * | 10/1999 | Collet et al. ........... 296/97.11 |
| 5,967,588 A | * | 10/1999 | Collet et al. ........... 296/97.11 |
| 6,010,174 A | * | 1/2000 | Murdock et al. ........ 296/97.11 |
| 6,120,084 A | * | 9/2000 | Wieczorek ............... 296/97.9 |
| 6,220,644 B1 | * | 4/2001 | Tiesler et al. ........... 296/97.9 |
| 6,474,717 B2 | * | 11/2002 | Viertel et al. ........... 296/97.11 |
| 7,066,522 B2 | * | 6/2006 | Torii .................... 296/97.9 |

FOREIGN PATENT DOCUMENTS

DE      3141822 C2     6/1982
GB      1 422 368      1/1976

OTHER PUBLICATIONS

German Office Action, dated Jan. 30, 2004, 3 pages.
International Search Report, PCT/EP2004/001203, date of mailing Feb. 7, 2004, 2 pages.
Copy of PCT International Preliminary Report based on International Application No. PCT/EP2004/001203, date of issuance of report Sep. 16, 2005 (10 pgs.).

\* cited by examiner

*Primary Examiner*—Kiran B. Patel
(74) *Attorney, Agent, or Firm*—Foley & Lardner LLP

(57) ABSTRACT

An adjustment device for positioning a body portion of a sun visor includes a substantially flat base portion having opposite sides and a plurality of arcuate spring members extending in alternating fashion from each of the opposite sides to the other of the opposite sides and a gap exists between a free end of the arcuate spring fingers and the base portion, so that the arcuate spring members fit over the spindle member and are configured to flex as the arcuate spring members rotate about the spindle member.

26 Claims, 2 Drawing Sheets

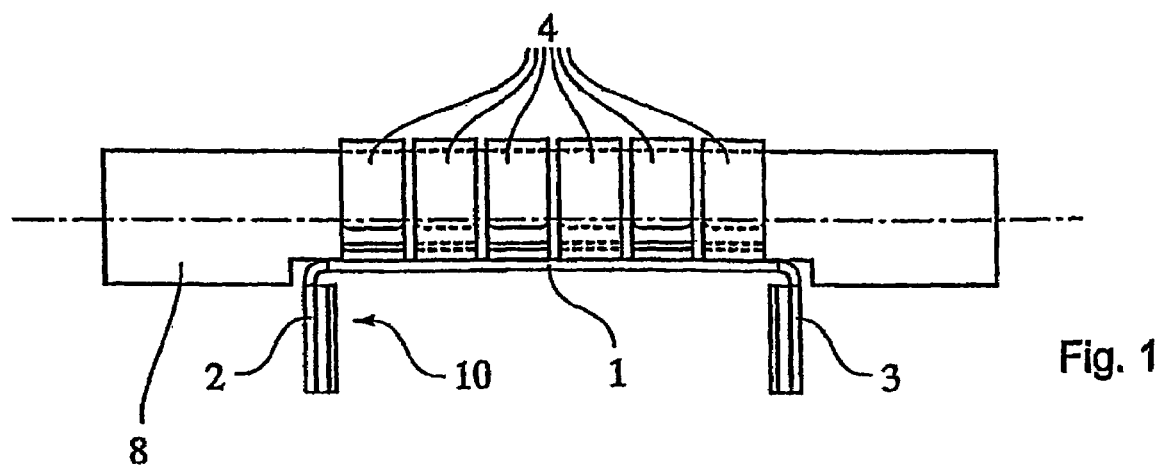
Fig. 1
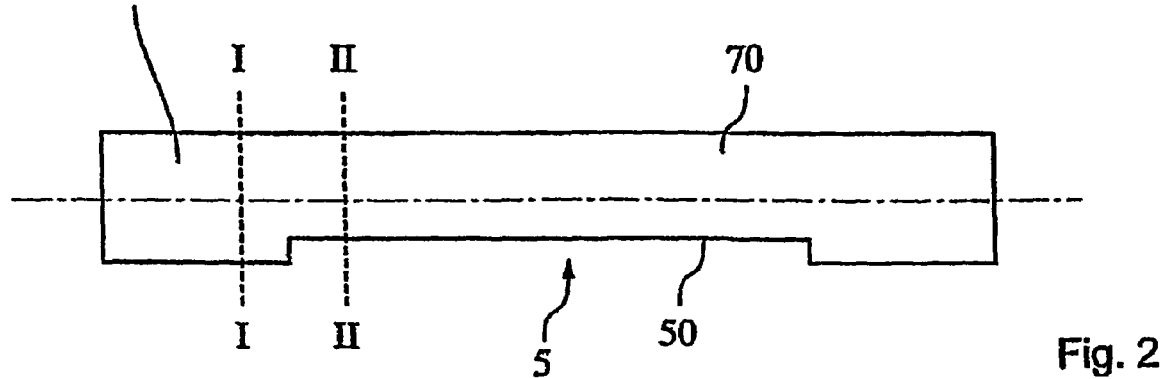
Fig. 2
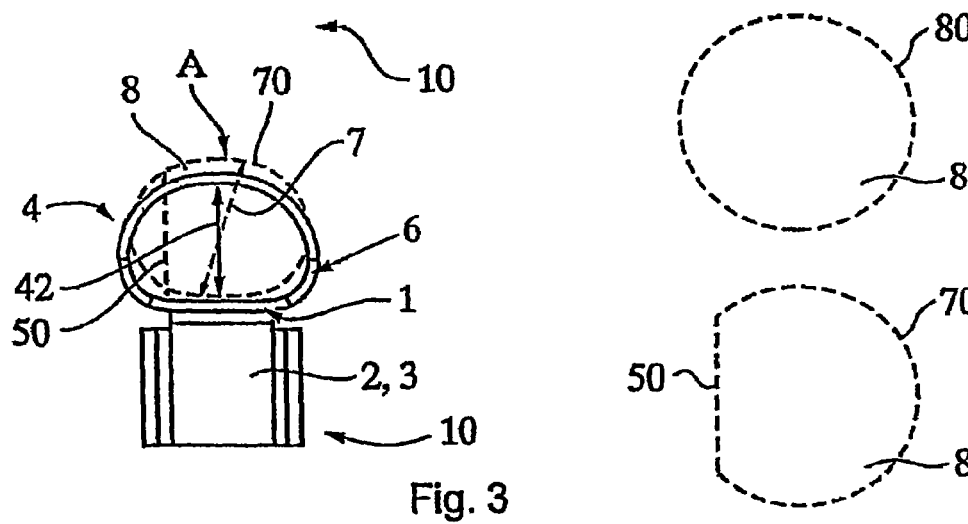
Fig. 3
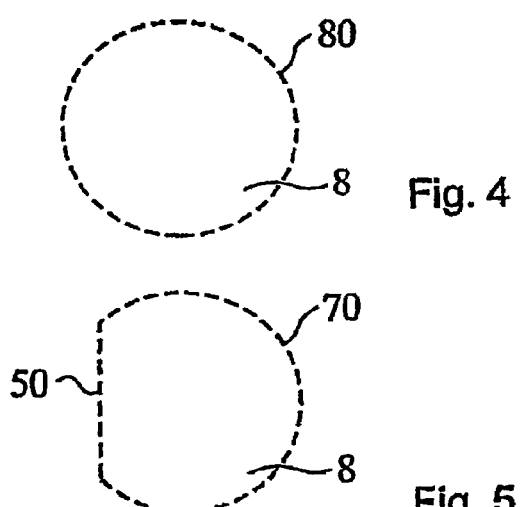
Fig. 4
Fig. 5

VISOR ADJUSTMENT DEVICE

CROSS REFERENCE TO RELATED APPLICATIONS

The present invention claims priority as a national stage application of International Patent Application Serial No. PCT/EP2004/01203 filed on Feb. 10, 2004, and German Patent Application Serial No. 10306733.7 filed on Feb. 17, 2003, which are incorporated herein by reference in their entirety.

FIELD

The present invention relates to a device for adjusting the position of a sun visor for a vehicle. The present invention relates more particularly to a device for arresting the position of a body of the sun visor about a spindle of the sun visor at desired locations.

BACKGROUND

Such sun visors are installed in modern motor vehicles and are therefore generally known. In this connection, the sun visor body is mounted rotatably around a spindle. In order that the body can be arrested in different angular positions around the spindle, a spring, which is connected to the sun visor body and is thus likewise rotatable around the spindle, serves to exert a force on the lateral surface of the spindle, which leads to resistance to further rotation. In a particularly advantageous angular position of the body, especially good arresting of the body is provided by in particular a flat portion on the spindle which otherwise has a cylindrical or cylinder-shaped lateral surface.

Such a sun visor is known from German laid-open specification DE 198 35 963 A1, for example. A clamping spring, which grips over the spindle with two legs, is arranged non-rotationally in the sun visor body and serves to hold the sun visor body in its angular position, and in the position of non-use of the sun visor body, lies with one leg on the flat portion and bears with its other leg against the lateral surface of the spindle. In this case, it is disadvantageous that at least parts of the clamping spring—in particular its outermost end—are in the region of the spindle arranged relatively far away from this spindle or from the lateral surface of the spindle in some positions of the body. This is disadvantageous inasmuch as the mechanical parts for arresting the sun visor body are in general embedded in a plastic matrix or a plastic covering and are consequently invisible from outside. In order to increase the durability of the plastic covering—also described for short as covering below—it is necessary to provide it with an adequate minimum thickness of material. This is difficult in the region of the spindle and in particular on that part of the body ("at the upper end of the sun visor") lying opposite the main part of the body because a greater material thickness of the covering also requires a greater spacing of the spindle from the vehicle interior facing, for example. Parts projecting a long way from the spindle which are necessary for arresting the sun visor consequently lead to an increased space requirement, increased weight and thus higher costs for such a component.

Accordingly, it would be desirable to produce a device for arresting a rotatable visor body in which—in particular in the region of the visor spindle which determines the spacing from the vehicle interior facing—regions projecting a long way from the spindle of the components provided for mechanical arresting are avoided.

SUMMARY

According to one embodiment, a device is provided for arresting a body which is rotatable around a spindle having a lateral surface. The body is settable in a first angular position and in a second angular position relative to the spindle and is arrestable more strongly in the first angular position by at least one first part surface of the lateral surface than in the second angular position. The device and the body are mechanically non-rotationally interconnected and the device comprises at least one spring element, where the device surrounds the lateral surface essentially completely except for a gap by its spring element. The device preferably bears, outside the region of the gap, essentially completely against the two part surfaces of the lateral surface at least in one of the angular positions relative to the spindle, so that in the region of the spindle no parts projecting a long way are necessary for arresting the body at the "upper end" of the body. In a preferred embodiment, the device comprises a base element interacting with the first part surface of the lateral surface to bring about especially good arresting of the body in the first angular position. This has the advantage that the position of non-use of the sunshade is occupied and held especially stably. Furthermore, this has the advantage that the base element is flat at the bottom, so that, below the base element and thus in immediate proximity to the spindle, space is therefore available, for example for accommodating a cosmetic mirror or rear-view mirror, which would not be available in the "clamping" or arresting region of the spindle in the case of a device projecting a long way into the body.

According to a preferred embodiment, the spring element, starting from the base element, surrounds the lateral surface of the spindle to a great extent in a first bending direction around it and that furthermore a further spring element, starting from the other side of the base element, surrounds the lateral surface of the spindle to a great extent in a second bending direction around it, the first and second bending directions being opposite. The device may also be displaceable relative to the body in the axial direction in relation to the spindle, to provide a sun visor which is not only rotatable but also displaceable along the spindle. This is possible in an especially cost-effective way with the device.

The present invention also relates to a body, in particular a sun visor body for use in a vehicle, which comprises a device according another embodiment. Such a body typically comprises a wire frame and is provided with a covering—also described as foamed covering below—which is made of EPP—expanded polypropylene—for example. In this connection, the wire frame is connected to the device and placed into a mold for production of the covering. The covering material is introduced into the mold, and the covering is provided with the intended shape by the action of pressure and temperature. Accordingly, it is desirable that the covering has an adequate minimum thickness in all places but in particular in especially stressed places such as for example in the region of the spindle.

The present invention also relates to an arrangement for arresting a body, the arrangement comprising a device and the body together with the spindle, the first part surface of the lateral surface of the spindle being non-round or flattened. The second part surface is advantageously essentially cylindrical. This has the advantage that the spindle can be produced especially simply and cost-effectively.

The invention is explained in greater detail below with reference to illustrative embodiments shown in the drawings.

BRIEF DESCRIPTION OF THE DRAWINGS

FIG. 1 shows a side view of a device with a spindle introduced into it according to an exemplary embodiment.

FIG. 2 shows a side view of a spindle with a first section line and a second section line according to an exemplary embodiment.

FIG. 3 shows a sectional illustration of the device with the spindle according to an exemplary embodiment.

FIG. 4 shows a sectional illustration of the spindle along the first section line in FIG. 2.

FIG. 5 shows a sectional illustration of the spindle along the second section line in FIG. 2.

DETAILED DESCRIPTION

Figure 6:
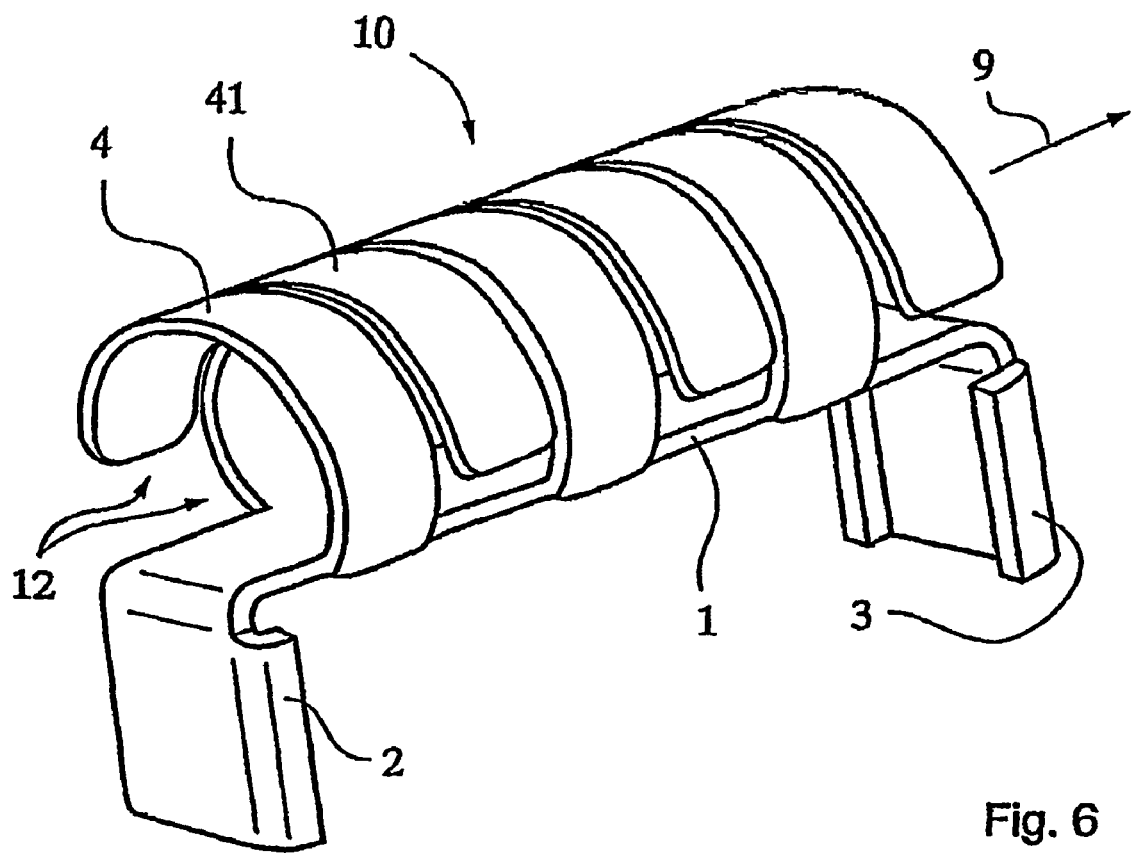
FIG. 6 shows a perspective illustration of the device according to an exemplary embodiment.

FIG. 1 illustrates a device 10 according to an exemplary embodiment with a spindle 8 introduced into it in side view. The device 10 comprises a base element 1, which is provided essentially in the form of an elongate flat component, in particular a metal plate, and has at its ends bent-off portions, which are designated by reference numbers 2 and 3. In FIG. 1, a total of six spring elements 4 are arranged, starting from the base element 1 of the device 10. The spring elements 4 surround the spindle 8, starting from the base element 1. In this connection, the spring elements 4 are, along the spindle 8, that is from left to right in FIG. 1, connected to the base element 1 alternately on different sides of the base element 1 relative to the axial extension of the base element 1. According to the illustrated embodiment, the base element 1, its two angled portions 2, 3 and the spring elements 4 are in particular provided in one piece and together form the device 10. This is shown in a perspective illustration in FIG. 6. For the sake of simplicity, only one of the spring elements 4 is provided with the reference number 4 in FIG. 6, and another, for better differentiation, with the reference number 41. In a direction, which is indicated in FIG. 6 by an arrow provided with the reference number 9 and corresponds to the axial extension of the base element 1, first the spring element designated by the reference number 4 is, starting—seen in the direction 9—from the right side of the base element 1, bent according to a special curve over the base element 1 toward its left side in a counterclockwise bending direction, and then the further spring element designated by the reference number 41 is, starting from the left side of the base element 1, bent according to a special curve over the base element 1 toward its right side in a clockwise bending direction. In this connection, however, the bending of the spring elements 4, 41 is not so complete that the spring elements 4, 41 touch the base element 1 again on the side in each case opposite their starting sides, but a gap 12 is provided between the base element 1 and the spring elements 4, 41. By virtue of this, the ends of the spring elements 4, 41 in FIG. 6 are free and thus capable of exerting a restoring force if they are deflected out of their rest position. In the rest position of the spring elements 4, 41, the gap 12 corresponds to an opening of approximately 20°, for example. According to the invention, the gap is present because the spring elements 4, 41, which during their production are typically plastically deformed starting from sheet metal blanks, elastically recover a little after the bending operation for their production.

FIG. 2 illustrates the spindle 8 in side view with a first section line I—I and a second section line II—II. In the region of the first section line, the spindle 8 has in particular a circular cross section as is shown in FIG. 4, which represents a sectional illustration of the spindle 8 along the first section line I—I. In FIG. 4, the lateral surface of the spindle 8 is designated by the reference number 80 in the region of the first section line I—I. In FIG. 2, the spindle 8 has a recess 5, which is provided in the form of a surface or a flattened or non-round region of the spindle 8; in the region of the second section line. In the region of the second section line II—II, that is in the region of the recess 5, the recess 5 divides the lateral surface of the spindle 8 into a first part surface 50 of the lateral surface and a second part surface 70 of the lateral surface. For better clarification of the flattened or non-round region of the spindle 8, FIG. 5 represents a sectional illustration of the spindle 8 along the second section line II—II with its first portion 50 of the lateral surface and its second portion 70 of the lateral surface of the spindle 8.

FIG. 3 shows a sectional illustration of the device 10 in the region of a spring element 4 and also the spindle 8 indicated by a dashed line, according to an exemplary embodiment. The device 10 again comprises the portions 2, 3 angled away from the base element 1 and also the spring elements 4. FIG. 3 shows two of the spring elements 4 projected one on top of another. Each spring element is, starting from one side of the base element 1, bent over the base element 1 in each case in its bending direction—clockwise or counterclockwise—according to a special curve, the gap 12 described in connection with FIG. 6 between the free end of a spring element 4 and the side opposite its starting side on the base element 1 not being illustrated in FIG. 3, however, for the sake of clarity. The special curve of the bending or curvature of the spring elements 4 is provided in such a way that the "clear" distance designated by the reference number 42 between the base element 1 and the "highest" point—that is opposite the base element 1—designated by the reference A of a spring element 4 is smaller than the diameter 7 of the spindle 8. This gives rise, when the spindle 8 is located between the base element 1 and the spring elements 4—that is has been introduced into the device 10—to deflection of the spring elements 4 and consequently to a restoring force, not illustrated in FIG. 3, of the spring elements 4, which presses the spindle 8 against the base element 1. The spindle 8 is introduced into the device 10 by means of, for example, a cone (not illustrated in the figures) located at the front end of the spindle 8, which causes the spring elements 4 to expand accordingly for introduction of the spindle 8. FIG. 3 also shows the first and second part surfaces 50, 70. The special curve of the bending of the spring elements 4 is selected in such a way that the spindle 8 introduced into the device 10 can be rotated into any angular position relative to the device 10 without locking. In particular a position of the first part surface 50 in contact with the base element 1 is therefore possible. This angular position is also designated below as the first angular position. In this case, the device 10 bears—at least outside the region of the gap 12—essentially completely with its base element 1 and at least one of the spring elements 4 against the two part surfaces 50, 70 of the lateral surface. The spring elements 4 are in this case deflected to a lesser extent because the entire diameter 7 of the spindle 8 does not have to be accommodated in the region of the distance 42—that is between the base element 1 and the highest point A of a spring element 4—but only the diameter 7 minus the recess, known from FIG. 2 and designated there by the reference number 5, of the spindle 8. Owing to the smaller spring deflection of the spring elements 4 in the first angular position, any change in this position leads to greater deflection of the spring elements 4, so that a greater force has to be applied for such a change than for a change in the angular position starting from another angular position. For any angular position—that is in particular those in which the base element 1 is in contact with the second part surface 70 of the lateral surface—it is the case, however, that the device 10 according to the illustrated embodiment surrounds the spindle 8 and thus the portions 50, 70 of the lateral surface essentially completely, except for the gap 12, with its spring elements 4. Such other angular position is also designated generally below as a second angular position. An "up-and-down movement" of the spring elements 4 takes place between the first and second angular positions. In this connection, the size of the gap 12 of course changes.

The number of spring elements 4 may be varied. Surrounding the spindle 8 from both sides of the base element 1 increases the stability of the spindle 8 in the device 10, but a single spring element 4 is also possible according to the invention. Furthermore, provision is made to provide the special curve of the bending of a spring element 4 for the purpose of interacting with the first part surface 50 to provide particularly good arresting of the body in angular positions other than the first angular position. This is achieved by a flattened portion (not illustrated) of the special curve of a spring element 4, for example.

Figure 7:
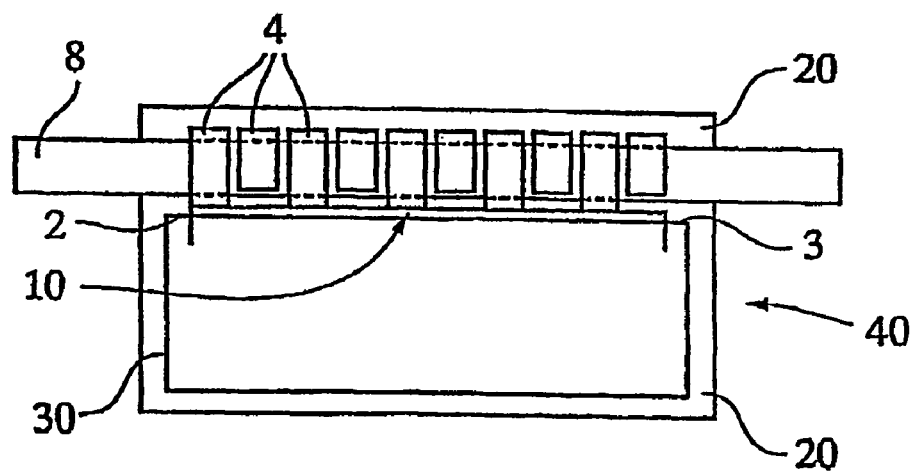
FIG. 7 shows a diagrammatic illustration of the body according to an exemplary embodiment.

FIG. 7 shows a diagrammatic illustration of the body 20 and the arrangement 40 according to an exemplary embodiment. The body 20 comprises a wire frame 30, which is connected to the device 10. According to the invention, this connection is provided in particular via the angled or bent regions 2, 3 of the device 10, so that the device 10 and the body 20 are mechanically non-rotationally interconnected. The wire frame 30 and the device 10 are together surrounded with a plastic covering or foam-covered. The plastic covering is not illustrated specifically with a reference number in FIG. 7, but the body 20 essentially comprises, in particular with regard to its external dimensions, the plastic covering. In addition to the body, the arrangement 40 also comprises the mounted spindle 8, which is likewise indicated in FIG. 7. The spring elements 4 are also indicated in FIG. 7.

What is claimed is:

1. A device for adjusting a sun visor body which is rotatable around a spindle having a lateral surface, the body being settable in a first angular position and in a second angular position relative to the spindle, the body being, with regard to rotation around the spindle, arrestable more strongly in the first angular position by at least one first part surface of the lateral surface than in the second angular position, the device and the body being mechanically non-rotationally interconnected, the device comprising a base fixed to the sun visor body and a plurality of curved leaf spring elements extending in an alternating manner from opposite sides of the base, wherein the base and the spring elements substantially surround and bear against the lateral surface of the spindle except for a gap between a free end of each spring element and the base.

2. The device as claimed in claim 1, wherein the lateral surface has a second part surface, the device bearing, outside the region of the gap, substantially completely against the two part surfaces of the lateral surface at least in one of the angular positions relative to the spindle.

3. The device as claimed in claim 1, wherein base interacts with the first part surface of the lateral surface in the first angular position of the body for relatively stronger arresting of the body in comparison with the second angular position of the body.

4. The device as claimed in claim 1, wherein a first group of spring elements substantially surround the lateral surface in a first bending direction except for the gap, and a second group of spring elements substantially surround the lateral surface in a second bending direction opposite to the first bending direction except for the gap.

5. The device as claimed in claim 4, wherein the first group of spring elements and the second group of spring elements are connected to the base on different sides of the base relative to the axial extension of the base along the spindle.

6. The device as claimed in claim 4 wherein the spring elements surround the lateral surface alternately in the first and in the second bending direction along the axial extension of the base element parallel to the spindle.

7. The device as claimed in claim 1, wherein the device and the body are mechanically interconnected in such a way that the device is displaceable relative to the body in the axial direction in relation to the spindle.

8. The device as claimed in claim 1, wherein the base and the plurality of spring elements are interconnected in one piece.

9. The device as claimed in claim 1 wherein the device is made of a metal or an alloy.

10. The device as claimed in claim 1, wherein the body comprises a wire frame, the device being connected to the wire frame.

11. The device as claimed in claim 10, wherein the body comprises a foamed covering, the foamed covering substantially surrounding the wire frame and the device.

12. The device as claimed in claim 11, wherein the foamed covering is provided in the form of an expanded polypropylene foamed covering.

13. The device as claimed in claim 10 wherein the body is provided in the form of a sun visor for a vehicle.

14. The device of claim 1, wherein the first part surface of the lateral surface of the spindle is non-round or flattened.

15. The device as claimed in claim 14, wherein the second part surface is substantially cylindrical.

16. A device for arresting a sun visor having a body portion rotatable about a spindle member between a first angular position and a second angular position relative to the spindle member, the device being non-rotatably coupled to the body portion for rotation about the spindle member;

the device comprising a base portion non-rotatably coupled to the body portion of the sun visor and having a first side and a second side and at least one first curved leaf spring member extending from the first side toward the second side and at least one second curved leaf spring member extending from the second side toward the first side, wherein the spring members and the base substantially surround the spindle and the spring members are biased to bear on a lateral surface of the spindle member as the body portion of the sun visor is rotated about the spindle member.

17. The device of claim 16 wherein the first spring member comprises a plurality of first spring members and the second spring member comprises a plurality of second spring members and the first spring members and the second spring members are arranged in an alternating configuration.

18. The device of claim 16 wherein the spindle includes a flat portion configured to produce a first rotational resistance when positioned adjacent the spring members and a second rotational resistance that is greater than the first rotational resistance when the flat portion is positioned adjacent to the base portion.

19. The device of claim 16 wherein the positioning device further comprises a gap between a free end of the first spring member and the second side of the base portion, and a gap between a free end of the second spring member and the first side of the base portion.

20. The device of claim 16 wherein the body portion further comprises a wire frame coupled to the positioning device and substantially surrounded by a covering material.

21. A device for arresting a sun visor body that is rotatable about a spindle member between a first angular position and a second angular position relative to the spindle member, the device being non-rotatably coupled to the body and comprising:
   a substantially flat base portion having opposite sides extending parallel to the spindle member and non-rotatably coupled to the sun visor body;
   a plurality of arcuate leaf spring members extending in alternating fashion from each of the opposite sides to the other of the opposite sides of the base portion;
   wherein the spindle member fits within an opening formed by the base portion and the arcuate leaf spring members and the arcuate leaf spring members are configured to flex as the arcuate leaf spring members rotate about and bear against a lateral surface of the spindle member.

22. The device of claim 21 wherein the base portion is configured to align with a flat segment on the spindle member to arrest a body portion of the sun visor in a first position and the base portion is movable away from the flat segment to arrest the body portion in a plurality of second positions.

23. The device of claim 22 wherein alignment of the base portion with the flat segment provides a stronger arresting of the body portion than alignment of the base portion with the arcuate spring members.

24. The device of claim 23 wherein the base portion further comprises projections configured to couple the base portion to the body portion in a non-rotational manner.

25. The device of claim 21 wherein the base portion and the arcuate spring fingers are axially slidable along the spindle member and rotatable about an axis of the spindle member.

26. The device of claim 21 wherein a gap exists between a free end of the arcuate spring fingers and the base portion.

* * * * *